US011686449B2

(12) United States Patent
Katami et al.

(10) Patent No.: US 11,686,449 B2
(45) Date of Patent: Jun. 27, 2023

(54) VEHICLE HEADLAMP DEVICE

(71) Applicant: SUBARU CORPORATION, Tokyo (JP)

(72) Inventors: Kenshin Katami, Tokyo (JP); Shunichi Nakamura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/826,739

(22) Filed: May 27, 2022

(65) Prior Publication Data

US 2022/0397257 A1 Dec. 15, 2022

(30) Foreign Application Priority Data

Jun. 11, 2021 (JP) ................................ 2021-097976

(51) Int. Cl.
*F21S 41/692* (2018.01)
*F21S 41/33* (2018.01)
*F21S 41/25* (2018.01)
*F21S 41/141* (2018.01)

(52) U.S. Cl.
CPC .......... *F21S 41/692* (2018.01); *F21S 41/141* (2018.01); *F21S 41/25* (2018.01); *F21S 41/33* (2018.01)

(58) Field of Classification Search
None
See application file for complete search history.

(56) References Cited

U.S. PATENT DOCUMENTS

2017/0227184 A1\* 8/2017 Ishida .................... F21S 41/40

FOREIGN PATENT DOCUMENTS

JP 2007-190986 A 8/2007

\* cited by examiner

*Primary Examiner* — Elmito Breval
(74) *Attorney, Agent, or Firm* — McGinn I.P. Law Group, PLLC.

(57) ABSTRACT

A vehicle headlamp device to be applied to a vehicle includes a light source and a lens. The light source configured to emit illumination light. The illumination light is to pass through the lens. The lens includes an illumination light converging portion configured to, when a part of the illumination light passes through the illumination light converging portion, converge the part of the illumination light. The illumination light converging portion is provided in a region through which high-beam illumination light emitted from the light source passes. The illumination light converged by the illumination light converging portion is used as marking light at an optical axis adjustment that is performed during manufacturing of the vehicle.

11 Claims, 5 Drawing Sheets

VEHICLE HEADLAMP DEVICE

CROSS-REFERENCE TO RELATED APPLICATIONS

The present application claims priority from Japanese Patent Application No. 2021-097976 filed on Jun. 11, 2021, the entire contents of which are hereby incorporated by reference.

BACKGROUND

The disclosure relates to a vehicle headlamp device, and in particular, relates to a vehicle headlamp device in which an illumination light converging portion is provided on a lens, a part of high-beam illumination light is converged, and the converged illumination light is used as marking light for optical axis adjustment during vehicle manufacturing, so that a light-dark boundary generated by a cut line of a low beam is relaxed, and inconvenience for a driver is eliminated.

As an example of an aiming adjustment method for a vehicle lamp in the related art, a method using a low-beam light distribution pattern has been known. A low-beam lamp has a desired light distribution pattern in which an optical axis is directed downward so as not to dazzle an oncoming vehicle. In a case of left hand traffic such as in Japan, the low-beam light distribution pattern has a horizontal cut line in a right region and a cut line inclined toward the upper left in a left region.

An intersection of the horizontal cut line and the oblique cut line is called an elbow point, and it is assumed that the elbow point is a center of the light distribution pattern. In headlight test, it is determined whether the optical axis of the low-beam lamp is oriented in a defined direction by detecting whether the elbow point is within a predetermined range (see, for example, Japanese Unexamined Patent Application Publication No. 2007-190986).

SUMMARY

An aspect of the disclosure provides a vehicle headlamp device to be applied to a vehicle. The vehicle headlamp device includes a light source and a lens. The light source is configured to emit illumination light. The illumination light is to pass through the lens. The lens includes an illumination light converging portion configured to, when a part of the illumination light passes through the illumination light converging portion, converge the part of the illumination light. The illumination light converging portion is provided in a region through which high-beam illumination light emitted from the light source passes. The illumination light converged by the illumination light converging portion is used as marking light at an optical axis adjustment that is performed during manufacturing of the vehicle.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

Figure 1:
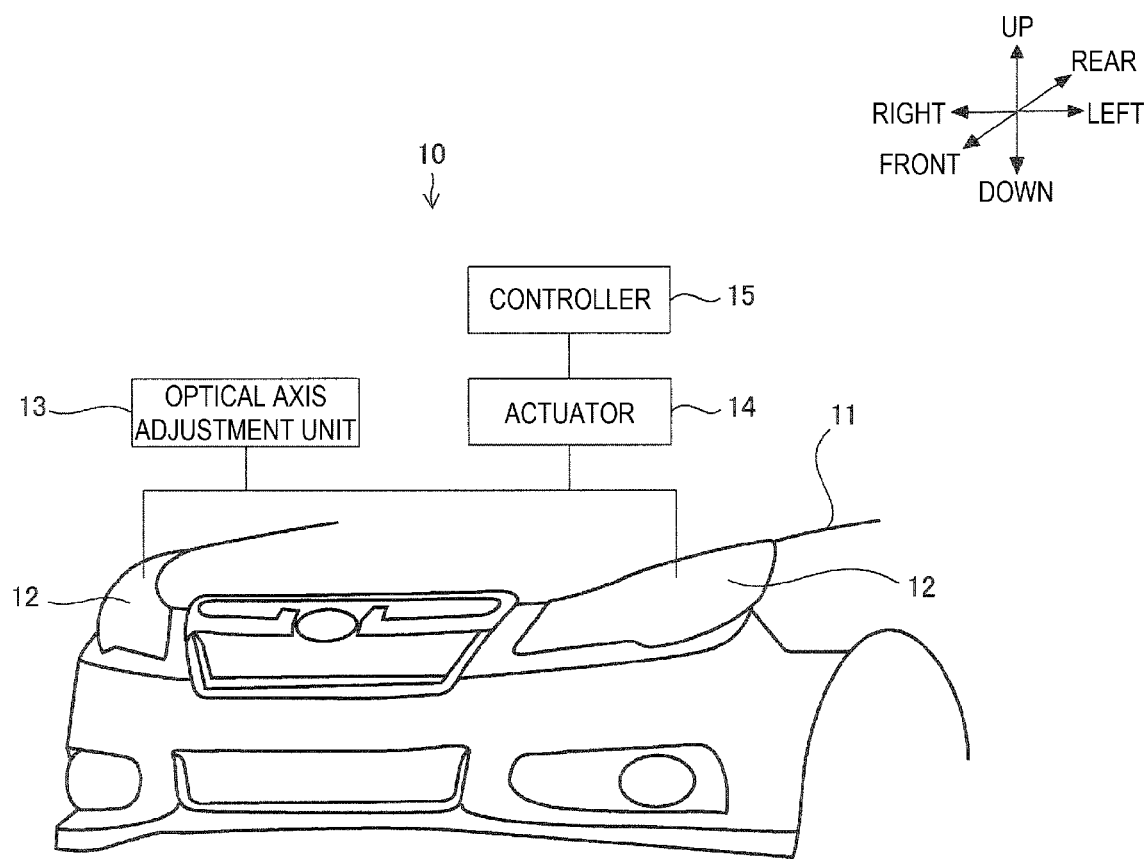
FIG. 1 is a block diagram illustrating a vehicle headlamp device according to an embodiment of the disclosure.

An aiming adjustment method for a vehicle lamp in the related art detects whether an elbow point is within a predetermined range. To this end, a light-dark boundary generated by the horizontal cut line and inclined cut line of the low-beam light distribution pattern is highlighted, so that the elbow point is made clear and the accuracy of the determination is improved. That is, the aiming adjustment method for a vehicle lamp in the related art highlights the light-dark boundary, which is generated by the cut lines of the low-beam light distribution pattern.

However, when the light-dark boundary generated by the cut lines is highlighted, the following situation may occur. If a road surface or a preceding vehicle is illuminated with light of the low-beam light distribution pattern during normal running of a vehicle, the light-dark boundary generated by the cut lines is too clearly visible to a driver, so that it becomes difficult for the driver to look ahead of the vehicle, which is inconvenient for the driver.

In particular, immediately before a running vehicle approaches a climbing lane on a slope, more light of the low-beam light distribution pattern is projected on a road surface than a down lane or a flat lane, and the light-dark boundary is too clearly visible to the driver. Thus, it becomes difficult for the driver to look ahead of the vehicle, and the driver is likely to feel uneasy.

Since a blurred region of the light of the low-beam light distribution pattern is reduced, an illuminated region of the road surface during the normal running of the vehicle is reduced, which deteriorates the field of vision of the driver.

It is desirable to provide a vehicle headlamp device in which an illumination light converging portion is provided on a lens, a part of high-beam illumination light is converged, and the converged illumination light is used as marking light for optical axis adjustment during vehicle manufacturing, so that a light-dark boundary generated by a cut line of a low beam is relaxed, and inconvenience for a driver is eliminated.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First, a vehicle headlamp device 10 according to the embodiment of the disclosure will be described in detail with reference to the accompanying drawings. In the following description, an up-down direction represents a height direction of a vehicle 11, a left-right direction represents a vehicle width direction of the vehicle 11, and a front-rear direction represents a longitudinal direction of the vehicle 11.

Figure 2:
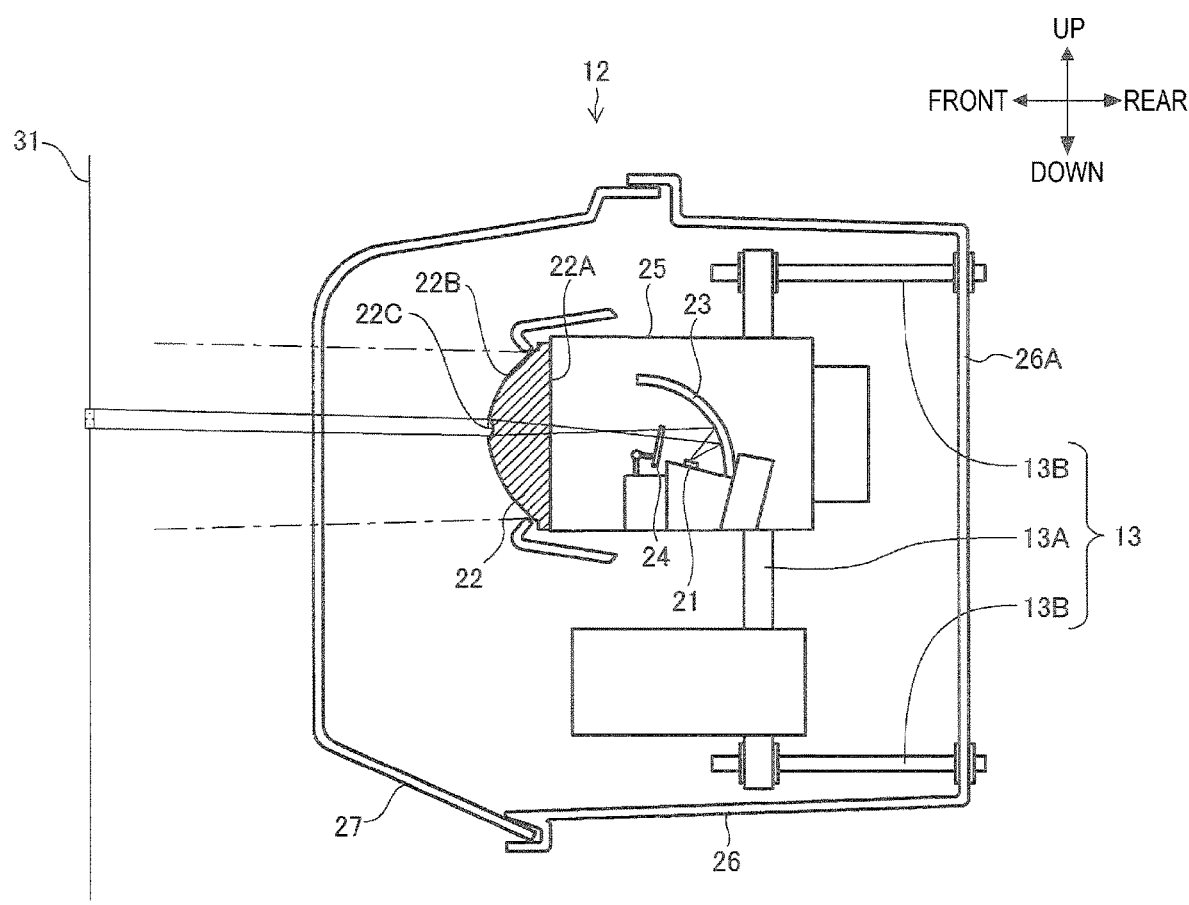
FIG. 2 is a cross-sectional view of the vehicle headlamp device according to the embodiment of the disclosure.
Figure 3:
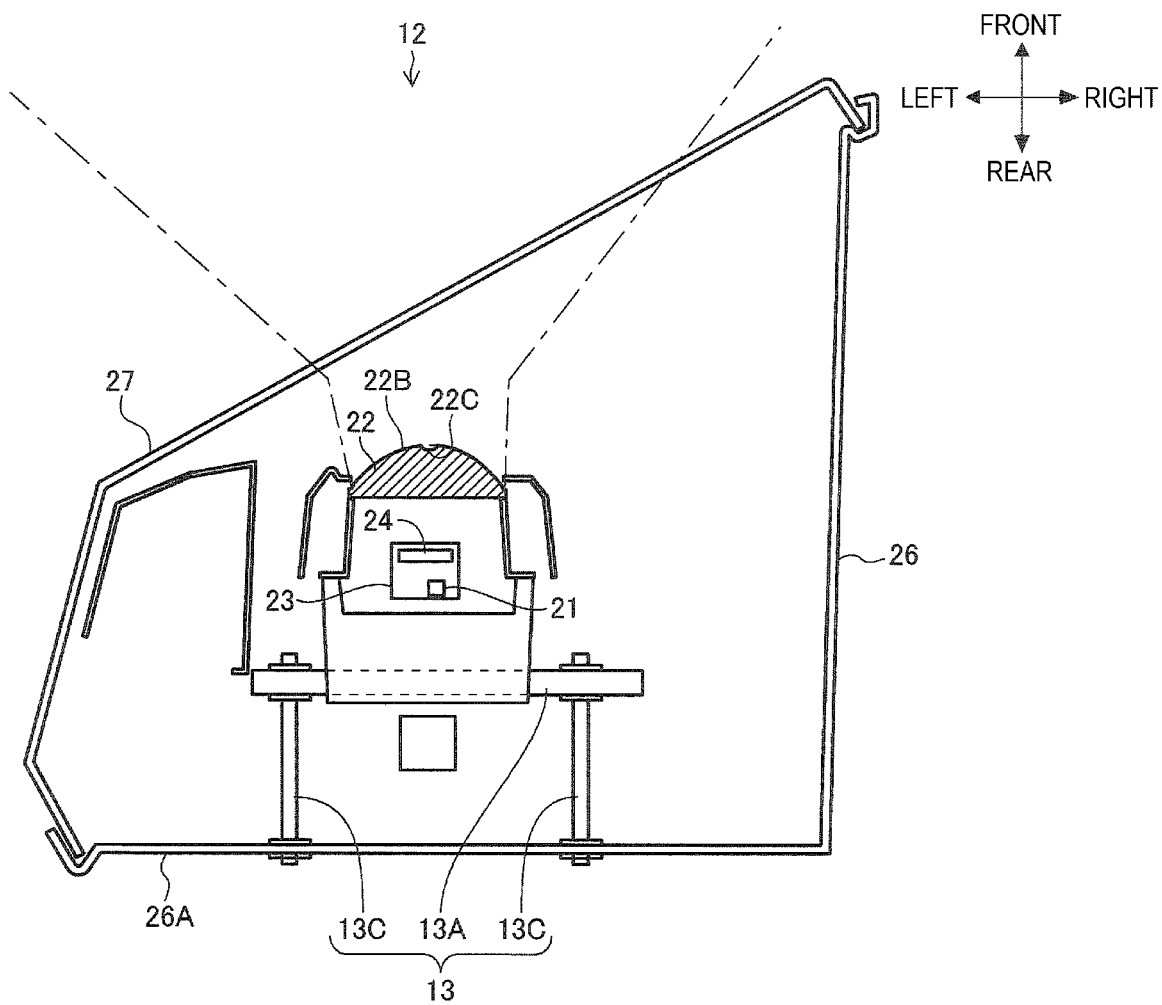
FIG. 3 is a cross-sectional view of the vehicle headlamp device according to the embodiment of the disclosure.

FIG. 1 is a block diagram illustrating the vehicle headlamp device 10 according to the present embodiment. FIG. 2 is a cross-sectional view of a headlamp unit 12 of the vehicle headlamp device 10 according to the present embodiment, taken along the height direction of the vehicle 11. FIG. 3 is a cross-sectional view of the headlamp unit of the vehicle headlamp device 10 according to the present embodiment, taken along the vehicle width direction of the vehicle 11.

As illustrated in FIG. 1, the vehicle headlamp device 10 mainly includes the headlamp units 12 disposed at a front end of the vehicle 11, an optical axis adjustment unit 13 that is disposed in the headlamp units 12 and adjusts optical axes of the headlamp units 12, reflectors 23 (see FIG. 2) each of which reflects illumination light emitted from a respective one of light sources 21 (see FIG. 2) to the front side of the vehicle 11, shades 24 (see FIG. 2) each of which blocks a part of the illumination light reflected by a respective one of the reflectors 23, an actuator 14 that moves the reflectors 23 and the shades 24, and a controller 15 that controls the actuator 14 according to an illumination region of the illumination light.

The actuator 14 is implemented by, for example, a stepping motor or the like, and is coupled to the reflectors 23 and the shades 24 constituting the headlamp units 12. The actuator 14 adjusts a low-beam illumination region 44 (see FIG. 5) and a high-beam illumination region 45 (see FIG. 5) during running of the vehicle by appropriately moving the reflectors 23 and the shades 24 under the control of the controller 15.

The controller 15 includes, for example, a central processing unit (CPU), a read only memory (ROM), a random access memory (RAM), and the like. The controller 15 is an electronic control unit (ECU) that executes various calculations and the like for controlling the vehicle headlamp device 10.

The controller 15 stores position data, angle data, and the like of the reflectors 23 and the shades 24 for forming the low-beam illumination region 44 and the high-beam illumination region 45. The controller 15 controls the actuator 14 in response to a user's operation of an operation unit (not illustrated) of a steering member (not illustrated), so that low-beam illumination light or high-beam illumination light 33 is emitted from the headlamp unit 12 (see FIG. 4).

As illustrated in FIGS. 2 and 3, the headlamp unit 12 mainly includes the light source 21, a lens 22, the reflector 23 and the shade 24 that adjust the illumination region of the light emitted from the light source 21, a housing 25 that supports the light source 21 and the lens 22, an outline member 26 that supports the optical axis adjustment unit 13, and a front cover 27 disposed on a front surface of the outline member 26. For convenience of description, in FIG. 3, the light source 21 and the shade 24 whose upper parts are covered with the reflector 23 are also illustrated by solid lines.

The headlamp unit 12 according to the present embodiment is an integrated headlamp unit with a low beam and a high beam. As the light source 21, for example, one light emitting diode (LED) is used. The light emitting diode is electrically coupled to a circuit board (not illustrated), and the circuit board is fixed at a desired position inside the housing 25. The illumination light emitted from the light source 21 is adjusted by the reflector 23 and the shade 24, and travels on a defined optical axis toward the front side of the vehicle 11.

The lens 22 is, for example, a projector lens. The lens 22 is disposed on the front side of the vehicle 11 with respect to the light source 21 and closes a front opening of the housing 25. As illustrated, the lens 22 is a transparent resin lens. A surface of the lens 22 on the light source 21 side is a planar lens surface 22A, and a surface of the lens 22 on the opposite side is a convex lens surface 22B. With this structure, the illumination light emitted from the light source 21 directly enters the lens from the planar lens surface 22A, is diffused when passing through the convex lens surface 22B, and then illuminates an area ahead of the vehicle 11 as the low-beam illumination light or the high-beam illumination light.

Although details will be described later with reference to FIGS. 4 and 5, an illumination light converging portion 22C is provided on the convex lens surface 22B of the lens 22. In one example, the illumination light converging portion 22C is provided on a region of the convex lens surface 22B through which the high-beam illumination light 33 passes. As illustrated, the illumination light converging portion 22C is provided, for example, by forming a part of the convex lens surface 22B into a flat surface. A part of the high-beam illumination light 33 passing through the illumination light converging portion 22C is converged to illuminate an area ahead of the vehicle 11 without being diffused. The illumination light converged by the illumination light converging portion 22C is used as marking light 32 for optical axis adjustment (see FIG. 4).

The reflector 23 has, for example, a bowl shape curved toward the front side of the vehicle 11. An inner surface of the reflector 23 is subjected to a plating process or a coating process and has a reflection surface. The reflector 23 reflects the illumination light emitted from the light source 21 toward the front of the vehicle 11. Meanwhile, the shade 24 is disposed in front of the reflector 23, and blocks a part of the illumination light reflected by the reflector 23.

As described above, the reflectors 23 and the shades 24 can be moved through the actuator 14 controlled by the controller 15. Thus, the low-beam illumination light and the high-beam illumination light 33 are emitted from the headlamp unit 12.

The housing 25 is, for example, made of a metal and has a cylindrical shape. The housing 25 opens on the front side of the vehicle 11. A vehicle rear side of the housing 25 is fixed at a desired position to a support plate 13A of the optical axis adjustment unit 13. Then, the housing 25 is movable integrally with the support plate 13A. The optical axis adjustment of the illumination light emitted from the light source 21 is performed by finely adjusting an orientation of the support plate 13A.

The outline member 26 is, for example, formed by injection molding of a resin material, and constitutes the outline of the headlamp unit 12. Four main struts 13B and 13C of the optical axis adjustment unit 13 are assembled to the outline member 26, and the outline member 26 movably supports the optical axis adjustment unit 13. Then, the headlamp unit 12 is fixed to the vehicle 11 by assembling the outline member 26 to a vehicle body at the front end of the vehicle 11.

The front cover 27 is made of a transparent resin and is assembled so as to close the front surface of the outline member 26. The front cover 27 is processed into a desired shape according to a shape of the front end of the vehicle 11, and constitutes a design surface of the vehicle 11. Then, the illumination light emitted from the light source 21 passes through the lens 22 and the front cover 27, and illuminates an area ahead of the vehicle 11.

As illustrated, the optical axis adjustment unit 13 mainly includes the support plate 13A that supports the housing 25, and the four main struts 13B and 13C that are fixed to the outline member 26 so as to be slidable in the front-rear direction of the vehicle 11. The main struts 13B and 13C each include, for example, a bolt and a nut, and are fixed to a rear end 26A of the outline member 26.

In each of the main struts 13B and 13C, a tip of the bolt advances to the front of the vehicle 11 when the nut is rotated in one direction, whereas the tip of the bolt retracts to the rear of the vehicle 11 when the nut is rotated in the opposite direction. As will be described in more detail later, in an optical axis adjustment process during vehicle manufacturing, an operator operates the nuts to tilt the support plate 13A in the front-rear direction and the vehicle width direction of the vehicle 11, so that an angle of the housing 25 is adjusted and the optical axis of the illumination light emitted from the light source 21 is adjusted.

Figure 4:
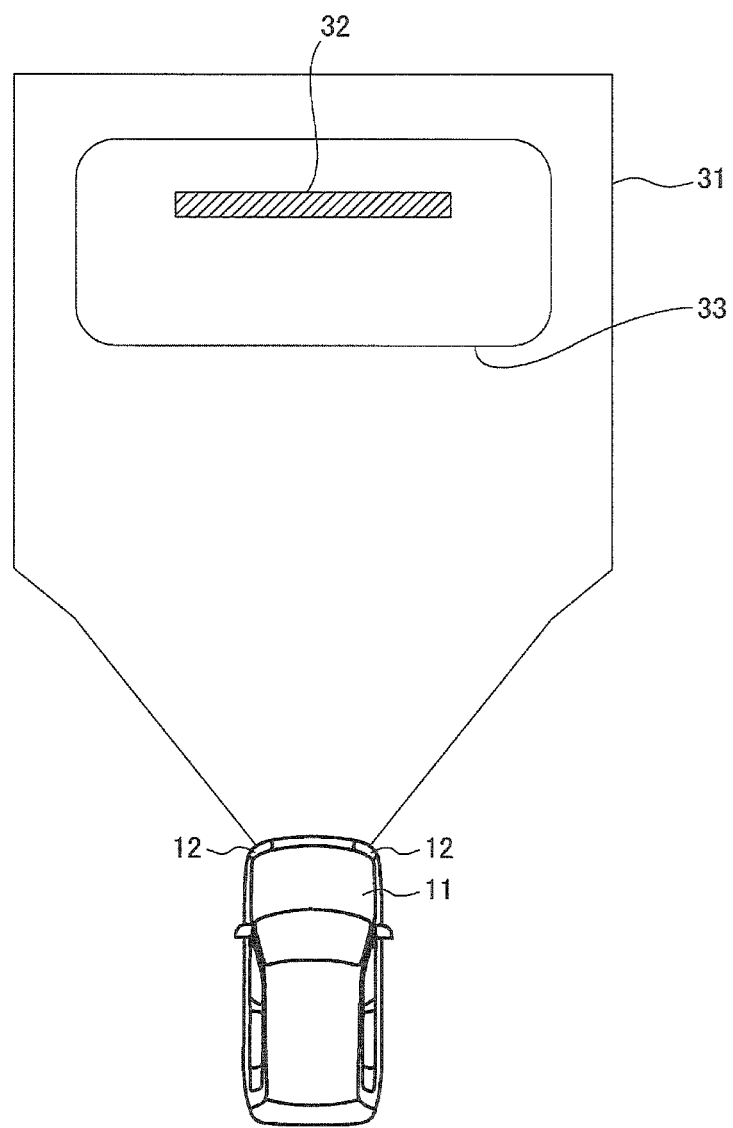
FIG. 4 is a schematic diagram illustrating an optical axis adjustment process of the vehicle headlamp device according to the embodiment of the disclosure.

FIG. 4 is a schematic diagram illustrating the optical axis adjustment process of the vehicle headlamp device 10 according to the present embodiment. FIG. 5 is a diagram illustrating the light distribution patterns of the vehicle headlamp device 10 according to the present embodiment.

FIG. 4 illustrates how to implement the optical axis adjustment process of the headlamp unit 12 in a manufacturing factory of the vehicle 11. As illustrated, an inspection screen 31 is fixed at a defined position with respect to a manufacturing line, and the optical axis adjustment of the headlamp unit 12 is performed with respect to the vehicle 11 that is conveyed on the manufacturing line.

The vehicle 11 is in front of the inspection screen and is stopped at an inspection position of the manufacturing line. The operator performs various settings for the vehicle 11 based on inspection conditions for the optical axis adjustment, and couples an optical axis diagnostic apparatus (not illustrated) to the controller 15. The optical axis diagnostic apparatus controls the light sources 21 (see FIG. 2) via the controller 15 to cause the light emitting diodes constituting the light sources 21 to emit light. The operator checks the marking light 32 for optical axis adjustment which is projected on the inspection screen 31, and performs the optical axis adjustment such that the marking light 32 matches a target (not illustrated) on the inspection screen 31.

Here, as described above, the illumination light converging portion 22C is provided on the region of the convex lens surface 22B through which the high-beam illumination light 33 passes. Therefore, in the optical axis adjustment process of the headlamp unit 12, the operator causes the high-beam illumination light 33 to illuminate the inspection screen 31, to thereby use a part of the high-beam illumination light 33 as the marking light 32 for optical axis adjustment. In the present embodiment, the illumination light converging portion 22C is provided on the convex lens surface 22B of the lens 22 to have a rectangular shape extending along the vehicle width direction, so that the marking light 32 having an illustrated shape is projected on the inspection screen 31.

As illustrated, the marking light 32 is formed by using a part of the high-beam illumination light 33. Thus, the high-beam illumination light 33 and the marking light 32 are projected on the inspection screen 31. The marking light 32 is converged by the illumination light converging portion 22C of the lens 22. Thus, a boundary of the marking light 32 is more clearly highlighted than the diffused high-beam illumination light 33 around the marking light 32. In particular, since the light emitting diodes are used as the light sources 21, the directivity of light is enhanced, so that the boundary can be highlighted.

As described above, while checking the marking light 32 projected on the inspection screen 31, the operator operates the main struts 13B and 13C of the optical axis adjustment unit 13 (see FIG. 2) to tilt the support plate 13A in the front-rear direction or the vehicle width direction of the vehicle 11, so that the angle of the housing 25 is adjusted, and the optical axis adjustment of the illumination light emitted from the light source 21 is performed.

The illumination light converging portion 22C is not limited to the rectangular shape. The illumination light converging portion 22C may have any shape if the illumination light converging portion 22C can be provided on the convex lens surface 22B of the lens 22. For example, the illumination light converging portion 22C may have a cross shape, a circular shape or a square shape or may be changed to any shape.

Figure 5:
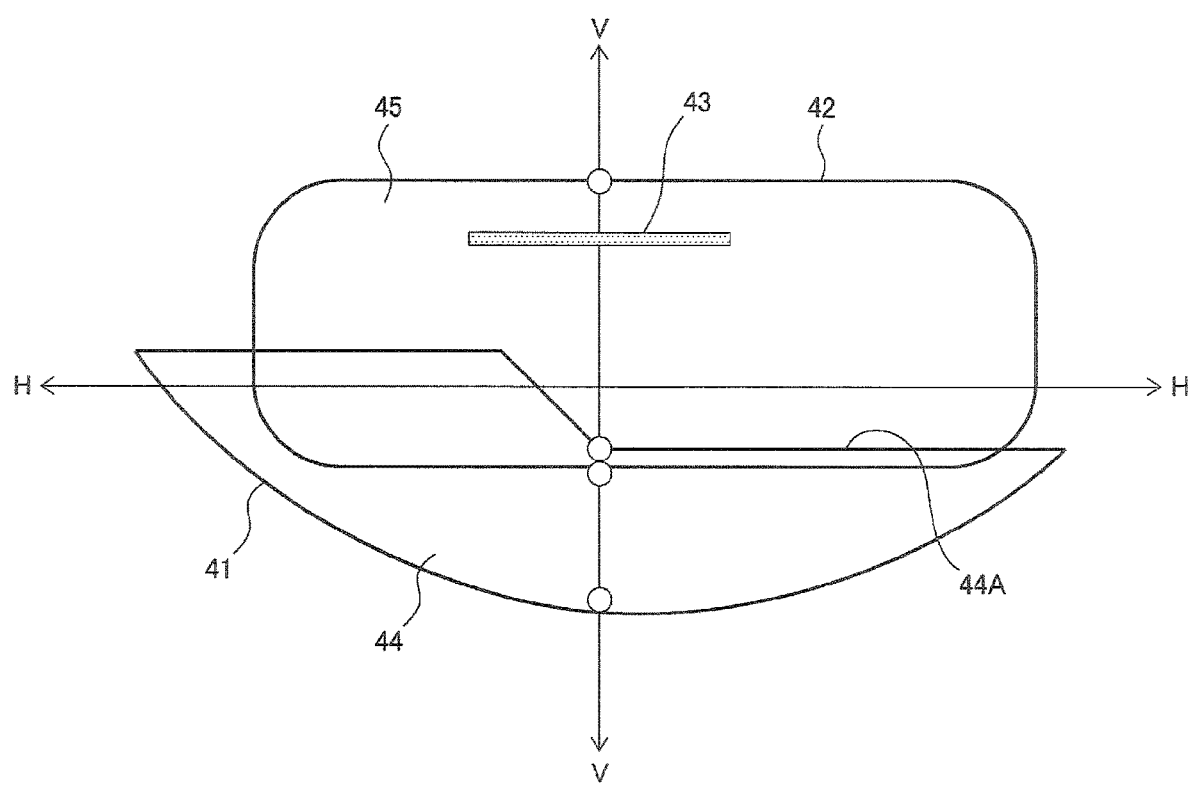
FIG. 5 is a diagram illustrating light distribution patterns of the vehicle headlamp device according to the embodiment of the disclosure.

In FIG. 5, a frame with a solid line 41 indicates an example of the low-beam illumination region 44, and a frame with a solid line 42 indicates an example of the high-beam illumination region 45. An illumination region 43 for optical axis adjustment is formed in the high-beam illumination region 45. As described above, in the present embodiment, the controller 15 controls the actuator 14 to appropriately move the reflectors 23 and the shades 24, so that the low-beam illumination region 44 and the high-beam illumination region 45 are adjusted.

Since the vehicle headlamp device 10 according to the present embodiment forms the illumination region 43 for optical axis adjustment inside the high-beam illumination region 45, it is not necessary to highlight a light-dark boundary of a cut-off line 44A of the low-beam illumination region 44. That is, in the low-beam illumination region 44, the light-dark boundary around the cut-off line 44A can be set to a blurred state.

As a result, the low-beam illumination light is emitted from the headlamp unit 12 during normal running of the vehicle 11, but the light at the cut-off line 44A and a neighboring region thereof is in an unclear state. Further, since the light-dark boundary generated by the cut line of the low-beam illumination light is relaxed, the driver is less likely to feel difficulty in visual recognition which may be caused by an illuminance difference on the road surface during vehicle running, and is less likely to feel inconvenience, for example, difficulty in seeing a running direction of the vehicle 11.

In addition, immediately before the vehicle 11 reaches a climbing lane on a slope during the normal running, in particular, much of illumination light of the cut-off line 44A is projected on the road surface of the climbing lane, and the light-dark boundary is too clearly visible to the driver. However, as described above, in the present embodiment, the light at the cut-off line 44A and the neighboring region thereof are set to the unclear state, the difficulty in the visual recognition which may be caused by the illuminance difference on the road surface ahead of the vehicle 11 is reduced, and the driver is less likely to feel anxiety and inconvenience.

In addition, it is not necessary to reduce the blurred region of the low-beam illumination light too much, the illuminated region of the road surface during the normal running of the vehicle 11 is secured and the field of vision of the driver is secured, so that running safety of the vehicle 11 is improved.

Meanwhile, the high-beam illumination light 33 illuminates a space diagonally above the vehicle 11 during the normal running of the vehicle 11, and thus a less amount of high-beam illumination light is projected on the road surface than that of the low-beam illumination light. Even when the light-dark boundary of the marking light 32 for optical axis adjustment is clearly highlighted, the light-dark boundary is not be projected on the road surface ahead of the vehicle 11 because of a projection direction of the high-beam illumination light 33. Thus, the driver is prevented from feeling inconvenience.

As a result, the light-dark boundary of the marking light 32 for optical axis adjustment is clearly highlighted, so that in the optical axis adjustment process of the headlamp unit 12, the operator can easily recognize the marking light 32 clearly projected on the inspection screen 31, which can improve the work efficiency of the optical axis adjustment and improve the accuracy of the optical axis adjustment.

In the present embodiment, the case where the illumination light converging portion 22C is provided on the lens 22 that is a projector lens has been described. The disclosure is not limited to this case. For example, a converging lens may be disposed in front of the lens 22. In this case, a part of the high-beam illumination light 33 is converged and is used as the marking light 32 for optical axis adjustment.

Also, the case where one light emitting diode is used as the light source 21 has been described. The disclosure is not limited to this case. For example, even when a halogen lamp or an HID lamp is used as the light source 21, the same effect as described above can be achieved with the illumination light converging portion 22C of the lens 22.

Furthermore, a structure that the reflector 23 and the shade 24 are used in the headlamp unit 12 has been described. The disclosure is not limited to this case. For example, even when (i) the light source 21 includes a plurality of light emitting diodes and (ii) the controller 15 performs an adaptive driving beam (ADB) control that selectively causes the plurality of light emitting diodes to emit light according to a high-beam light distribution pattern or the like and causes the illumination light emitted from the light source 21 to directly enter the lens 22, the same effect as described above can be achieved with the illumination light converging portion 22C of the lens 22. Various other modifications and alterations may be made without departing from the gist of the disclosure.

In the vehicle headlamp device according to the embodiment of the disclosure, a part of the high-beam illumination light is converged when passing through the illumination light converging portion of the lens, to thereby form the marking light for optical axis adjustment during vehicle manufacturing. The light-dark boundary generated by the cut line of the low beam is relaxed, and the inconvenience for the driver during the running of the vehicle is eliminated.

The invention claimed is:

1. A vehicle headlamp device to be applied to a vehicle, the vehicle headlamp device comprising:
   a light source configured to emit illumination light; and
   a lens through which the illumination light is to pass,
   wherein the lens comprises an illumination light converging portion configured to, when a part of the illumination light passes through the illumination light converging portion, converge the part of the illumination light,
   wherein the illumination light converging portion is provided in a region through which high-beam illumination light emitted from the light source passes, and
   wherein the illumination light converged by the illumination light converging portion illuminates within a first area, the first area is smaller than a second area that is illuminated by the high-beam illumination light, the first area is located within the second area and is located outside a third area that is illuminated by low-beam illumination light emitted from the light source.

2. The vehicle headlamp device according to claim 1, wherein the lens comprises a projector lens.

3. The vehicle headlamp device according to claim 2, further comprising:
   a reflector configured to reflect the illumination light; and
   a shade configured to block a part of the illumination light reflected by the reflector, wherein
   the light source comprises a light emitting diode.

4. The vehicle headlamp device according to claim 1, wherein, when the high-beam illumination light is emitted from the light source, the first illuminated by the illumination light converged by the illumination light converging portion is highlighted than the second area around the first area.

5. The vehicle headlamp device according to claim 4, wherein the illumination light converging portion is provided by forming a part of a surface of the lens into a shape having a different curvature than a rest of the surface of the lens.

6. The vehicle headlamp device according to claim 5, wherein the illumination light converging portion is provided by forming the part of the surface of the lens into a flat surface.

7. The vehicle headlamp device according to claim 5, wherein the illumination light converging portion is provided by forming the part of the surface of the lens into a rectangular shape extending along a vehicle width direction.

8. The vehicle headlamp device according to claim 7, wherein a shape of the first portion corresponds to the shape of the illumination light converging portion.

9. The vehicle headlamp device according to claim 1, wherein the illumination light converging portion is provided by forming a part of a surface of the lens into a shape having a different curvature than a rest of the surface of the lens.

10. The vehicle headlamp device according to claim 9, wherein the illumination light converging portion is provided by forming the part of the surface of the lens into a flat surface.

11. The vehicle headlamp device according to claim 9, wherein the illumination light converging portion is provided by forming the part of the surface of the lens into a rectangular shape extending along a vehicle width direction.

* * * * *